(12) United States Patent  
Miyano

(10) Patent No.: US 6,637,302 B2  
(45) Date of Patent: Oct. 28, 2003

(54) MACHINING SYSTEM AND METHOD OF MACHINING A WORKPIECE USING THE MACHINING SYSTEM

(76) Inventor: Toshiharu Tom Miyano, 50 Dundee La., Barrington Hills, IL (US) 60010

( * ) Notice: Subject to any disclaimer, the term of this patent is extended or adjusted under 35 U.S.C. 154(b) by 0 days.

(21) Appl. No.: 09/816,728

(22) Filed: Mar. 22, 2001

(65) Prior Publication Data

US 2002/0134207 A1 Sep. 26, 2002

(51) Int. Cl.[7] .............................. B23B 1/00; B23B 3/30
(52) U.S. Cl. ........................... 82/1.11; 82/129; 82/149; 82/901
(58) Field of Search .................. 82/1.11, 142, 901, 82/124, 129, 149; 29/DIG. 50, 79, 94, 102

(56) References Cited

U.S. PATENT DOCUMENTS

| | | | |
|---|---|---|---|
| 1,782,138 A | | 11/1930 | Davis et al. |
| 3,955,258 A | | 5/1976 | Flisch |
| 4,218,815 A | | 8/1980 | Cumming |
| 4,457,193 A | * | 7/1984 | Matthey .................. 29/36 |
| 4,612,832 A | | 9/1986 | Ushigoe et al. |
| 5,127,140 A | * | 7/1992 | Oiwa et al. ............... 29/27 C |
| 5,152,201 A | * | 10/1992 | Izawa ..................... 82/1.11 |
| 5,655,423 A | * | 8/1997 | Nishio et al. .............. 82/1.11 |
| 5,815,902 A | * | 10/1998 | Osterried et al. ............ 82/117 |
| 5,842,393 A | * | 12/1998 | Nagel ..................... 29/36 |
| 6,298,758 B1 | * | 10/2001 | Wu ....................... 82/117 |

* cited by examiner

Primary Examiner—Daniel W. Howell
(74) Attorney, Agent, or Firm—Wood, Phillips, Katz, Clark & Mortimer

(57) ABSTRACT

A machining system having a first machine tool assembly with a first workpiece holder and a first machining unit for performing a processing operation on a workpiece held by the first workpiece holder, and a second machine tool assembly having a second workpiece holder and a second machining unit for performing a processing operation on a workpiece held by the second workpiece holder. The machining system further includes a base assembly on which the first and second machine tool assemblies are supported in an operative position. At least a part of the first machine tool assembly is repositionable by movement along a first line. At least a part of the second machine tool assembly is repositionable by movement along a second line that is non-parallel to the first line. The parts of the first and second machine tool assemblies are relatively repositionable along the first and second lines to facilitate transfer of a workpiece between the first and second machine tool assemblies.

38 Claims, 5 Drawing Sheets

MACHINING SYSTEM AND METHOD OF MACHINING A WORKPIECE USING THE MACHINING SYSTEM

BACKGROUND OF THE INVENTION

1. Field of the Invention

This invention relates to a machining system through which workpieces are processed and, more particularly, to a machining system having a plurality of machine tool assemblies that cooperate in processing a workpiece.

2. Background Art

It is an objective of designers of machining systems to minimize space requirements without compromising either the versatility or performance of these systems. It is known to set up multiple machine tool assemblies in an operation and to move a workpiece from one machine tool assembly to another to serially perform processing operations thereon. The "footprint" for such systems may be quite large.

U.S. Pat. No. 4,612,832 discloses a machining system in which a machine tool assembly is disposed angularly to its normal orientation. During machining, the workpiece is moved in a plane that is non-horizontal. An inclined surface underlies the machine tool assembly and guides lubricant, and pieces of a workpiece removed during processing, downwardly to a collection base. This arrangement reduces the footprint over what it would be with the machining system in a horizontal orientation.

It is also known to situate machine tool assemblies so that the operating axes thereof extend in a vertical direction. One example of such a system is shown in U.S. Pat. No. 1,782,138. This arrangement likewise results in a reduced footprint.

SUMMARY OF THE INVENTION

In one form, the invention is directed to a machining system having a first machine tool assembly with a first workpiece holder and a first machining unit for performing a processing operation on a workpiece held by the first workpiece holder, and a second machine tool assembly having a second workpiece holder and a second machining unit for performing a processing operation on a workpiece held by the second workpiece holder. The machining system further includes a base assembly on which the first and second machine tool assemblies are supported in an operative position. At least a part of the first machine tool assembly is repositionable by movement along a first line. At least a part of the second machine tool assembly is repositionable by movement along a second line that is non-parallel to the first line. The parts of the first and second machine tool assemblies are relatively repositionable along the first and second lines to facilitate transfer of a workpiece between the first and second machine tool assemblies.

In one form, the first machine tool assembly has a first central operating axis and the second machine tool assembly has a second central operating axis. The first line and a third line parallel to the first central operating axis reside in a first plane. The second line and a fourth line parallel to the second central operating axis reside in a second plane. The first and second planes are non-parallel to each other.

The first and second planes may define a downwardly opening angle of less than 135° therebetween. This angle may be on the order of 90°.

In one form, the first line extends at an angle to a horizontal reference plane.

In one form, the part of the first machine tool assembly includes a first headstock and the part of the second machine tool assembly includes a second headstock. Each of the headstocks has a central axis. The first and second headstocks are relatively repositionable into a workpiece exchange position wherein the central axes of the first and second headstocks are substantially coincident.

The base assembly may include first and second substantially flat surfaces cooperatively defining an inverted V shape. In one form, the first machine tool assembly is mounted on the first flat surface and the second machine tool assembly is mounted on the second flat surface.

The machining system may further include an upwardly opening receptacle for collecting foreign matter deposited on the first and second flat surfaces.

In one form, the base assembly further has an upwardly projecting support. The first flat surface has a width extending parallel to the central axis of the first headstock, with the upwardly projecting support having a width dimension parallel to the central axis of the first headstock that is substantially less than the width of the first flat surface.

In one form, the first workpiece holder is a first headstock and the first machining unit is an indexable turret with a plurality of machining tools.

The first machine tool assembly may further include a first conveyor for delivering workpieces to be processed to a transfer position.

The machine tool assembly may further include a first transfer mechanism to engage a workpiece on the first conveyor and deliver an engaged workpiece toward a position at which the engaged workpiece can be operatively held by the first headstock.

The machine tool assembly may further include a second conveyor for delivering workpieces from the second workpiece holder to a point of use.

The second machine tool may include a second transfer mechanism to engage a workpiece on the second workpiece holder and deliver an engaged workpiece to a second conveyor.

The first transfer mechanism may have first and second jaws that are relatively movable between a gripping position, to hold a workpiece, and a release position.

In one form, the first central operating axis extends in a horizontal direction.

The invention is also directed to a machining system having a first machine tool assembly with a first headstock for holding a workpiece on which a processing operation is to be performed and a second machine tool assembly having a second headstock for holding a workpiece on which a processing operation is to be performed. The machining system further includes a base assembly on which the first and second machine tool assemblies are supported in an operative position. The first headstock is movable along two transverse axes residing in a first plane. The second headstock is movable along two transverse axes residing in a second plane. The first and second planes are non-parallel to each other.

In one form, the first and second planes cooperatively define an inverted V shape.

The first and second planes may open downwardly at an angle of less than 135°. The angle may be on the order of 90°.

The invention is also directed to a machining system including a first machine tool assembly having a first headstock for holding a workpiece on which a processing operation is to be performed and a second machine tool assembly having a second headstock for holding a workpiece on which a processing operation is to be performed. The machine tool assembly further includes a base assembly on which the first and second machine tool assemblies are supported in an operative position. The base assembly has a first substantially flat surface and a second substantially flat surface which is angularly oriented relative to the first flat surface so that first and second planes including the first and second flat surfaces define an inverted V shape. The first machine tool assembly resides above the first flat surface so that at least one of a lubricant and pieces of a workpiece removed during processing using the first machine tool assembly are guided downwardly by the first surface. The second machine tool assembly resides above the second flat surface so that at least one of a lubricant and pieces of a workpiece removed during processing using the second machine tool assembly are guided downwardly by the second surface.

The machining system may further include an upwardly opening receptacle for collecting at least one of lubricant and pieces of a workpiece removed during processing using the first machine tool assembly and guided downwardly by the first surface.

The first machine tool assembly may include a first headstock for holding a workpiece. The machine tool assembly may include a second headstock for holding a workpiece, with the first and second headstocks being relatively repositionable so as to facilitate exchange of a workpiece between the first and second headstocks.

In one form, the first and second headstocks have first and second axes and are relatively repositionable into an exchange position wherein the central axes of the first and second headstocks are substantially coincident.

In one form, the first headstock is positionable in an operating position and movable in a first plane between the operating position and a position in which the first headstock resides with the first and second headstocks in the exchange position. The first plane is angularly oriented relative to a horizontal reference plane.

In one form, the second headstock is positionable in an operating position and is movable in a second plane between the operating position for the second headstock and a position in which the second headstock resides with the first and second headstocks in the exchange position. The second plane is angularly oriented relative to the first plane and a horizontal reference plane.

The first and second planes may cooperatively define an inverted V shape.

The invention is also directed to a method of machining a workpiece, including the steps of: performing a first processing operation on a first workpiece using a first machine tool assembly; at the completion of the first processing operation moving the first workpiece in a first line that extends in a vertical direction; transferring the first workpiece to a second machine tool assembly; performing a second processing operation on the first workpiece; and moving the first workpiece along a second line that is non-parallel to the first line and extends in a vertical direction.

The first and second lines may cooperatively define an inverted V shape.

The method may further include the step of directing at least one of lubricant and pieces of the first workpiece removed during the first processing operation along a first inclined surface downwardly to a collection area.

The method may further include the step of collecting the at least one of lubricant and pieces of the first workpiece removed during the first processing operation in a receptacle.

The method may further include the step of directing at least one of lubricant and pieces of the first workpiece removed during the second processing operation along a second inclined surface downwardly to a collection area.

The first and second inclined surfaces may cooperatively define an inverted V shape.

In one form, the step of transferring the first workpiece involves repositioning at least one of a first headstock on the first machine tool assembly and a second headstock on the second machine tool assembly so that the first and second headstocks are in an exchange position so that the first workpiece can be transferred directly from the first headstock to the second headstock.

In one form, the first and second headstocks each have a central axis, and with the first and second headstocks in the exchange position, the central axes of the first and second headstocks are substantially coincident.

The step of performing the first processing operation may involve performing a first processing operation using a tool on a first indexable turret.

The step of performing a second processing operation may involve performing a second processing operation using a tool on a second indexable turret.

The method may further include the steps of advancing the first workpiece on a first conveyor toward a first headstock on the first machine tool assembly and through a first transfer mechanism engaging the first workpiece and delivering the first engaged workpiece to the first headstock.

The method may further include the steps of using a second transfer mechanism to remove the first workpiece from a second headstock on the second machine tool assembly and transferring the engaged first workpiece to a second conveyor through which the first workpiece is advanced to a point of use.

DETAILED DESCRIPTION OF THE DRAWINGS

Figure 1:
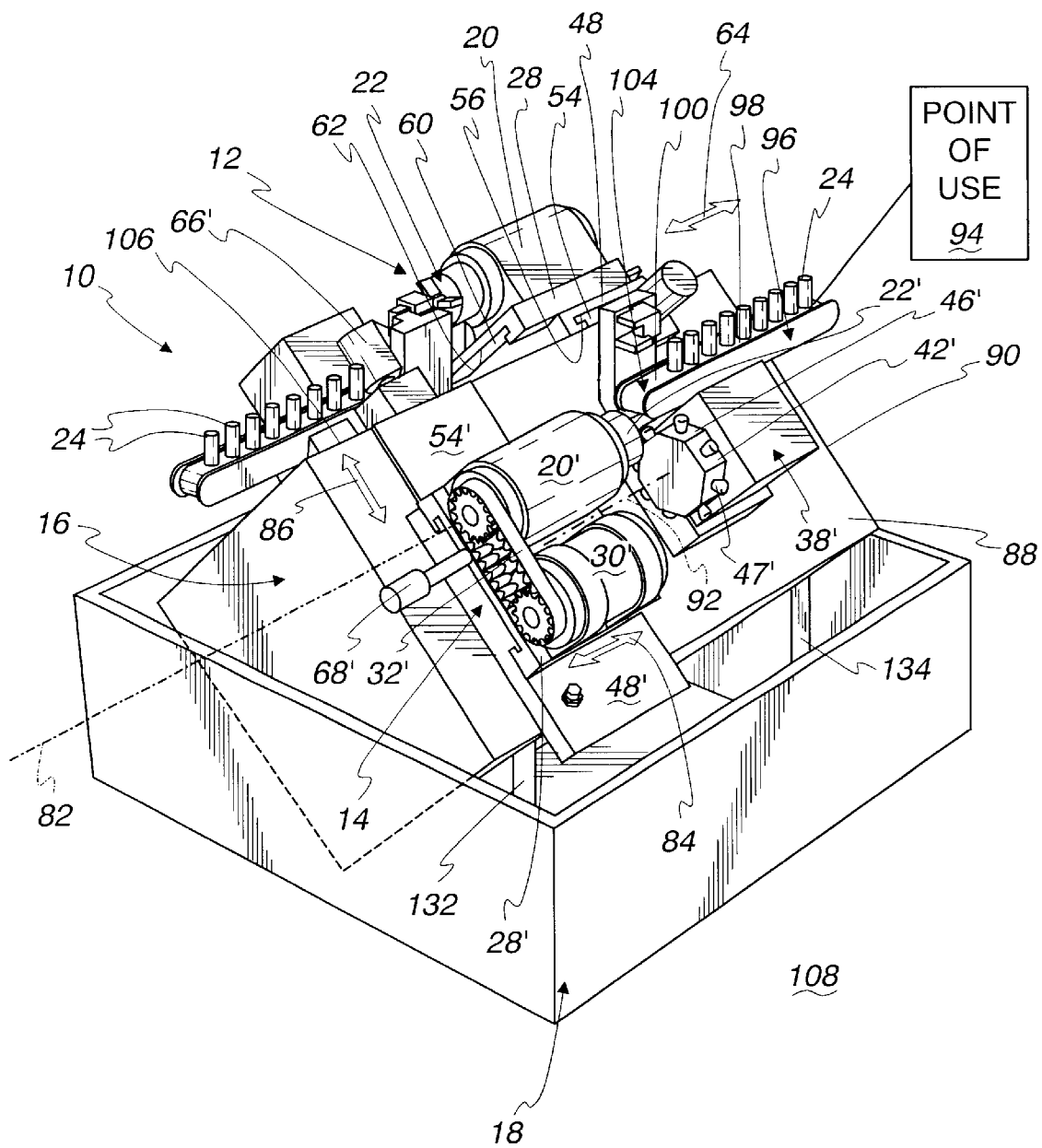
FIG. 1 is a perspective view of a machining system, according to the present invention, including first and second machine tool assemblies, and taken from one end and side thereof.

A machining system, according to the present invention, is shown in the Figures generally at 10. The machining system 10 consists of a first machine tool assembly at 12 and a second machine tool assembly at 14, which are supported in an operative position on a base assembly at 16. The base assembly 16 is mounted within an upwardly opening receptacle 18 into which foreign matter, such as lubricant and pieces of workpieces, removed during processing operations, can be accumulated.

The machine tool assemblies 12,14 are shown to have a similar construction. However, the inventive concept can be utilized with virtually any configuration of machine tool assembly. The machine tool assemblies shown are but exemplary in nature. The exemplary first machine tool assembly 12 consists of a first workpiece holder/headstock 20 which has a first spindle 22 for releasably gripping a workpiece 24 and which is rotatable around a central operating axis 26. The first headstock 20 is mounted on a first slide element 28. A first drive motor 30 is mounted on the slide element 28 and is operated to drive the spindle 22 about the axis 26. A drive force is transmitted from the motor 30 to the spindle 22 through an endless drive belt 32 trained around pulleys 34, 36 on each of the headstock 20 and motor drive shaft.

The first machine tool assembly 12 further includes a first machining unit 38 which consists of a base 40 to which an indexable turret 42 is mounted. The turret 42 is pivotable about a horizontal axis 44 that is substantially parallel to the spindle axis 26. The turret 42 has a polygonally-shaped outer surface 46, with each flat face thereon supporting a machining tool 47 for performing a processing operation on a workpiece.

The first slide element 28 cooperates with a second slide element 48 which is in turn mounted to an inclined surface 50 on a wall 52 of the base assembly 16. The wall 52 has a guide rail 54 projecting upwardly from the surface 50 and extending at an angle to horizontal. The guide rail 54 has a T-shaped cross section which fits in a complementary slot 56 formed in the second slide element 48. Through this arrangement, the second slide element 48 is guided relative to the base surface 50 along a line indicated by the double-headed arrow 58.

The second slide element 48 has a horizontally extending guide rail 60 with a T-shaped cross-sectional configuration that fits within a complementary slot 62 on the first slide element 28. Through this rail and slot arrangement, the first slide element 28 is movable guidingly relative to the second slide element 48 in a substantially horizontal line, indicated by double-headed arrow 64. The line of the arrow 64 is substantially orthogonal to the line of the arrow 58.

Servomotors 66,68 are mounted to the base assembly 16 and second slide element 48 to respectively move the slide element 48 along the line 58 and the slide element 28 along the line 64. The requisite movement imparted by the servomotors 66,68 may be effected through any mechanism well known to those skilled in the art. For example, the servomotors 66,68 may be operable to rotate a worm drive. Alternatively, hydraulic-type cylinders could be utilized to effect the necessary movement of the slide elements 28,48.

A feeding conveyor 70 has an endless belt 72 with an upwardly facing support surface 74 on which individual workpieces 24 can be supported and advanced from a supply 76 to a transfer location at 78.

The first machine tool assembly further includes a first transfer mechanism at 80. As will be explained in greater detail below, the first transfer mechanism 80 engages a workpiece 24 at the transfer location 78 on the feeding conveyor 70 and delivers the same to a position wherein the workpiece 24 can be engaged by the spindle 22 on the headstock 20. Once the active workpiece 24 is operatively held by the spindle 22, the slide element 28 can be moved to the left in FIG. 2 along the line 64. Thereafter, downward movement of the second slide element 48 situates the active workpiece 24 in operative relationship with a machining tool 47 on the turret 42.

The second machine tool assembly 14 is shown to have essentially the same elements as the first machine tool assembly 12. However, this is not necessary, and, as noted above, the second machine tool assembly 14 could have a configuration totally different from that of the first machine tool assembly 12. Throughout this description, elements on the second machine tool assembly 14 corresponding to those on the first machine tool assembly will be identified with like numbers, including a "'".

The second machine tool assembly 14 consists of a second workpiece holder/headstock 20' which has a spindle 22' that is rotated around a central operating axis 82. The spindle 22' is driven by a drive motor 30' through an endless drive belt 32'. The headstock 20' and motor 30' are mounted upon a slide element 28' which is guided relative to a slide element 48' in a horizontal line as indicated by double-headed arrow 84. The slide element 48' is guided in a direction along a line at an angle to horizontal as indicated by the double-headed arrow 86 along a guide rail 54', which projects upwardly from a flat surface 88 on a wall 90 of the base assembly 16.

The wall 90 supports a second machining unit 38' which includes an indexable turret 42' which is movable around an axis 92. The turret 42' has a polygonally-shaped outer surface 46' upon which the plurality of machining tools 47' are mounted. Servomotors 66',68' are operable to reposition the slide 48' and slide 28', respectively, along the lines 86,84.

As explained below, after the processing operation is performed by the first machine tool assembly 12 on a workpiece 24, the workpiece 24 is transferred to the second machine tool assembly 14 through which a separate processing operation may be performed thereon. At the conclusion of the second processing operation, the workpiece 24 is transferred from the second headstock 20' to a point of use 94. This transfer is effected using a discharge conveyor 96 that is similar in construction to the feeding conveyor 70. That is, the discharge conveyor 96 has an endless belt 98 with a supporting surface 100 for workpieces 24. Through the transfer mechanism 80, the individual workpieces 24 on the spindle 22' are engaged, removed therefrom, and placed at a transfer location 104 on the supporting surface 100 of the discharge conveyor 96. The endless belt 98 is then operated to direct the workpieces 24 serially from the transfer location 104 to the point of use 94.

Figure 4:
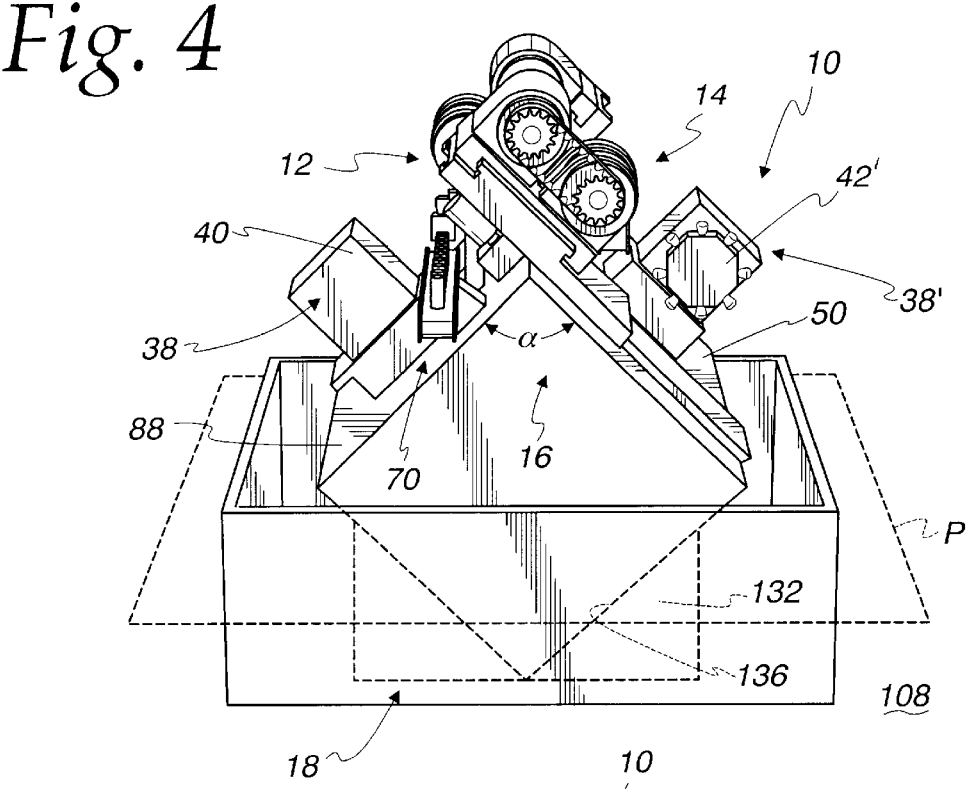
FIG. 4 is a perspective view of the machining system taken from the same end as in FIG. 1 and with the machine tool assemblies relatively situated to exchange a work piece therebetween.

The inclined wall surfaces 50,88 are preferably flat and meet at an apex 106. The surfaces 50,88 cooperatively define an inverted V-shape with an included angle $\alpha$. The angle $\alpha$ is preferably less than 135° and more preferably on the order of 90°. The surfaces 50,88 are dimensioned so that foreign material, since as lubricant and particles removed from workpieces during processing, and deposited thereon, moves under the force of gravity downwardly and into the receptacle 18 for accumulation therewithin. The surfaces 50, 88 have portions that are flat and uninterrupted from a location adjacent to the first and second workpiece holders/headstocks 20, 20' to a bottom edge of the base assembly 16 residing immediately over the receptacle. The lines of vertical movement of the headstocks 20,20', as indicated by the arrows 58,86, are preferably substantially parallel to the planes of the flat surfaces 50,88. Similarly, the lines of movement of the headstocks 20,20' in a horizontal direction, as indicated by the arrows 64,84, are parallel to the planes of the flat surfaces 50,88. The horizontal lines of movement indicated by the arrows 64,84 are preferably substantially parallel to the operating axes 26,82 for the headstocks 20,20' and the axes 44,92 for the indexable turrets 42, 42'. While the flat surfaces 50,88 may be at different angles with respect to a horizontal reference plane P (FIG. 4), in a preferred form, each of the surfaces 50,88 has the same angle of inclination relative to the horizontal reference plane P that is parallel to a flat, subjacent support surface 108 upon which the machining system 10 is placed.

Figure 2:
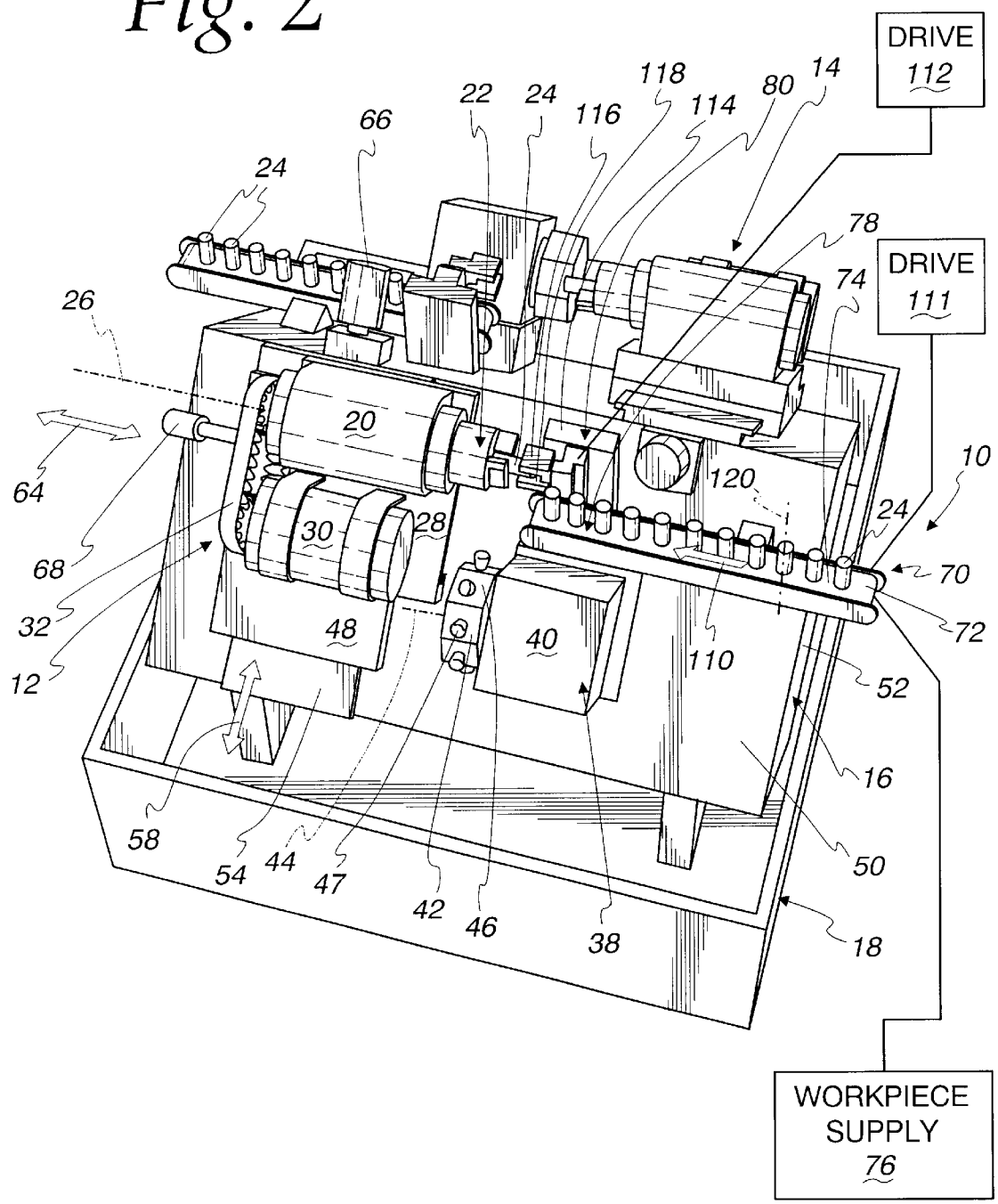
FIG. 2 is a perspective view of the machining system taken from the side opposite that in FIG. 1.
Figure 6:
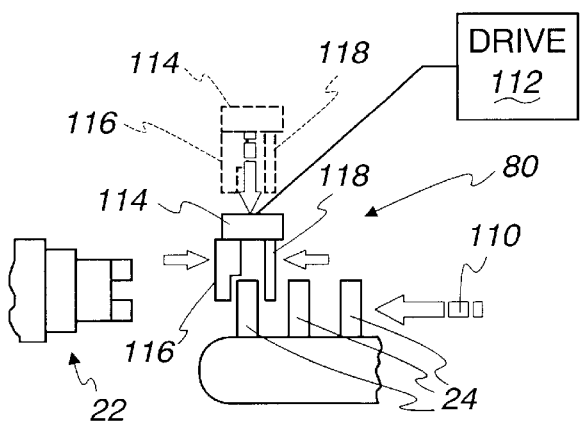
FIGS. 6, 7, 8, and 9 are fragmentary, side elevation views showing the sequence of transferring individual workpieces from a supply to spindles on one of the machine tool assemblies and withdrawing the same for transfer to a point of use.
Figure 7:
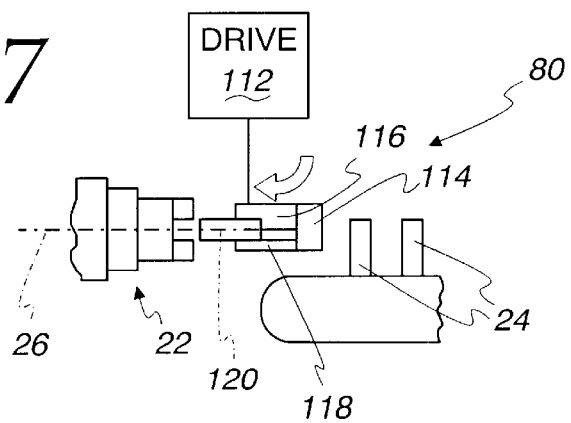
Figure 8:
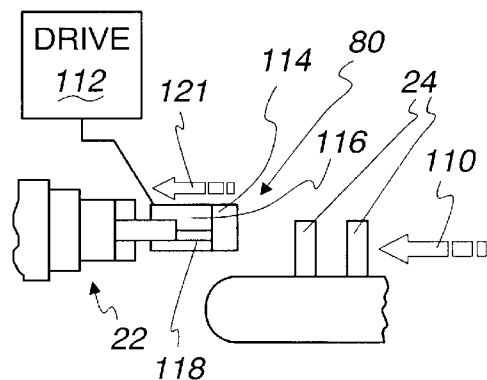
Figure 9:
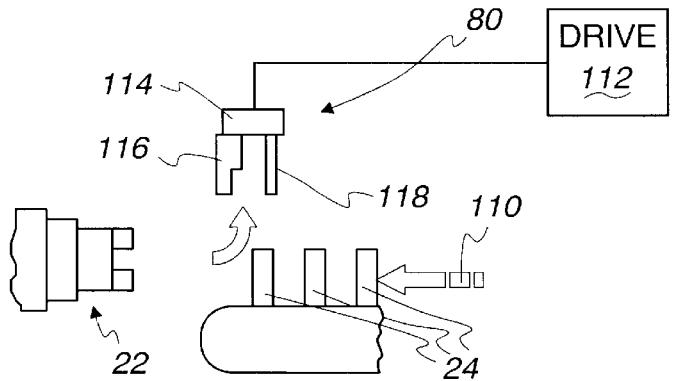

One exemplary machining operation will now be described. As seen in FIG. 2, individual workpieces 24 are delivered from the supply 76 onto the support surface 74 which is advanced to move the workpieces 24 in the direction of the arrow 110 toward the transfer location 78. Once this occurs, a drive 111 for the feeding conveyor 70 interrupts operation thereof. The details of operation of the transfer mechanism 80 are shown additionally in FIGS. 6–9. A drive 112 is operated to reposition a transfer arm 114 to a position shown in phantom lines in FIG. 6, wherein the transfer arm 114 is in a pickup position and retracted so that a pair of jaws 116,118 on the transfer arm 114 can be placed in a straddling position relative to a workpiece 24 at the transfer location 78. The drive 112 is then operated to translate the transfer arm 114 down to the solid line position in FIG. 6. As this occurs, the jaws 116,118 are maintained in a release position, in which they are spaced a distance greater than the dimension of the straddled workpiece 24. In the solid line position in FIG. 6, the jaws 116,118 can be moved towards each other to a gripping position, in which they clampingly engage a workpiece 24 at the transfer location 78. The transfer arm 114 is then pivoted to the position shown in FIG. 7, wherein the operating axis 120 of the workpiece 24 held by the transfer arm 114 is coincident with the central operating axis 26 of the headstock 20. The headstock 20 is actually slightly backed off to the left in FIG. 2 as the transfer arm 114 pivots to the solid line position FIG. 7. This allows the transfer arm 114 and workpiece 24, engaged thereby, to clear the spindle 22. Once the coaxial relationship between the workpiece 24 and the headstock axis 26 is established, the headstock 20 can be translated to the right in FIG. 2, and/or the transfer arm 114 can be translated to the left, as indicated by the arrow 121, in FIG. 8, until the workpiece 24 moves into the spindle 22 sufficiently to be engaged thereby. Once this engagement occurs, the jaws 116,118 on the transfer arm 114 can be moved to the release position. Through operation of the motor 68, the slide element 28 is moved to the left together with the workpiece 24 engaged in the spindle 22. The transfer arm 114 is then moved to the FIG. 9 position, from where another workpiece pickup and transfer operation can be initiated. Thereafter, the servomotor 66 is operated to drive the slide element 48 downwardly to situate the active workpiece 24 in the spindle 22 at the turret 42 so that it can be processed by the active machining tool 47 on the turret 42. One or more processing operations may be performed through one machining tool 47, or a combination of different machining tools 47, on the turret 42.

Figure 3:
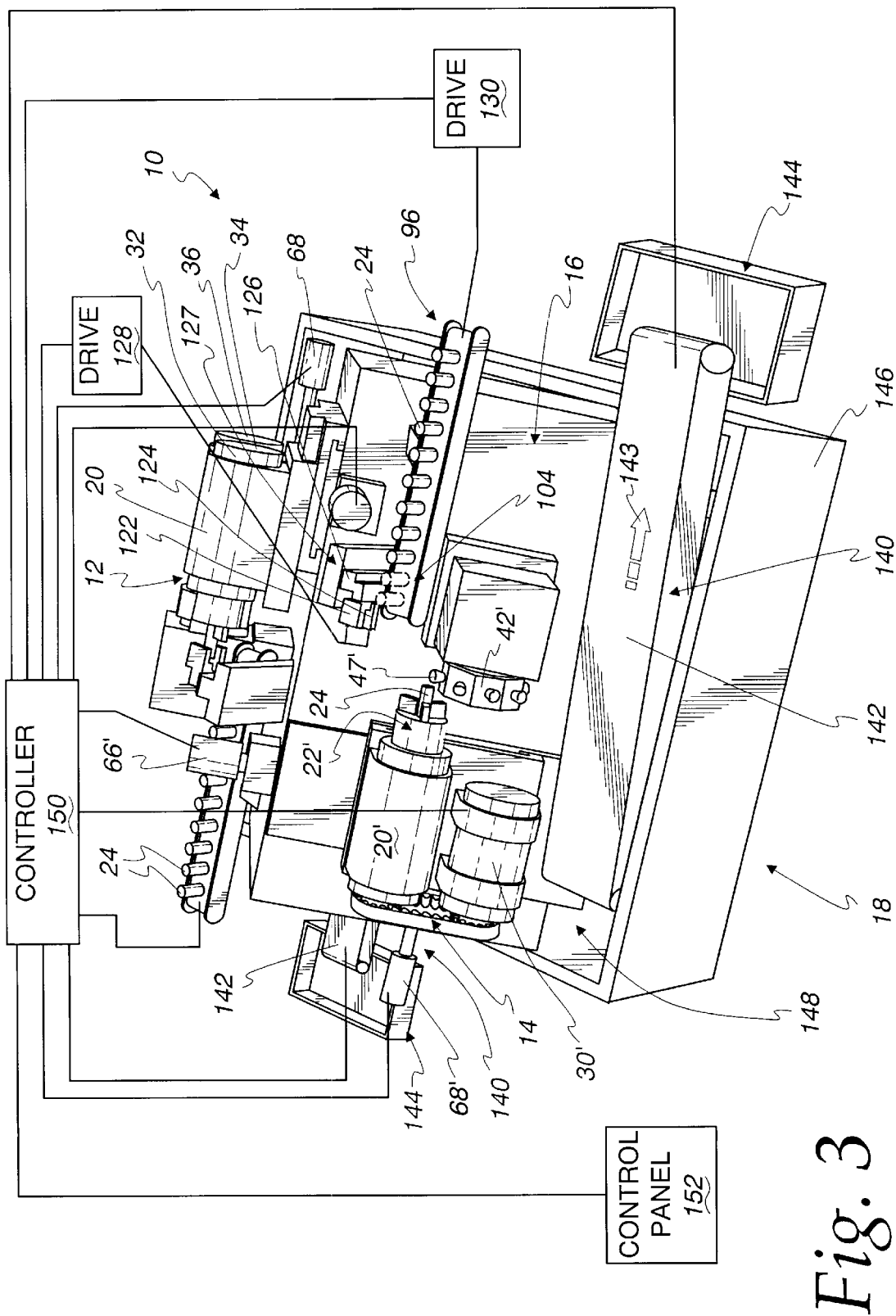
FIG. 3 is a perspective view of the machining system taken from the same side as in FIG. 1 and from the opposite end.
Figure 5:
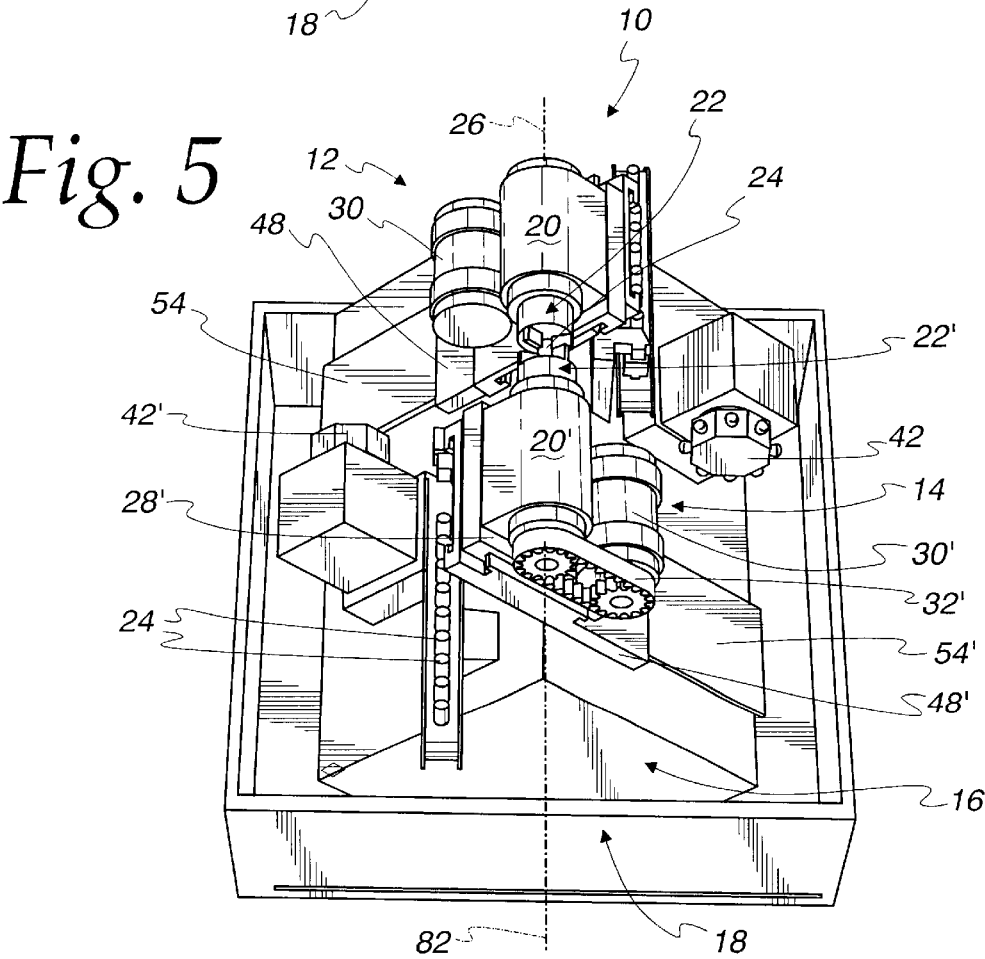
FIG. 5 is a perspective view from overhead and from the same end as in FIG. 4 with the machining tool assemblies relatively situated as in FIG. 4.

At the completion of processing by the first machine tool assembly 12, the first and second headstocks 20,20' are relatively repositioned to an exchange position, shown in FIG. 5, wherein the central operating axes 26,82 for the headstocks 20,20' are coincident. The exchange position is realized by vertically moving the slide elements 48,48' upwardly along their respective guide rails 54,54'. Once the exchange position is realized, one or both of the servomotors 68,68' can be operated to move the headstocks 20,20' closer together. As this occurs, the workpiece 24 held by the spindle 22 on the first headstock 20 can be transferred to the spindle 22' on the second headstock 20'. By locking the spindle 22' on the workpiece 24 and releasing the spindle 22, the workpiece 24 transferred from the spindle 22 becomes operatively held on the headstock 20'. By operating one or both of the servomotors 68,68', the spacing between the headstocks 20,20' can be increased sufficiently that the headstock 20' can be moved downwardly along the guide rail 54' so that the workpiece 24 held thereby can be situated as shown in FIG. 3 so that a further processing operation can be performed by one or more by machining tools 47' on the turret 42'. At the completion of this processing operation, the workpiece 24 can either be returned to the headstock 20 for further processing or transferred to the discharge conveyor 96 for conveyance to the point of use 94.

In the latter case, the headstock 20' can be repositioned through operation of the servomotors 66',68' to direct the active workpiece 24 between jaws 122,124 on a transfer arm 126 on a second transfer mechanism 127. The transfer mechanism 127 may be identical to the transfer mechanism 80. Once the workpiece 24 is moved between the jaws 122,124, the jaws 122,124, through a drive 128, can be moved toward each other to gripping position to achieve a position corresponding to that in FIG. 8. By releasing the spindle 22' and retracting the headstock 20' away from the transfer mechanism 80 to achieve a position corresponding to that in FIG. 7, the transfer arm 126 is allowed to pivot to a position corresponding to that in FIG. 5. This situates the workpiece 24 held thereby at the transfer location 104. By then placing the transfer arm 126 in a position corresponding to that in FIG. 9, the discharge conveyor 96 can be operated by a drive 130 to advance the processed workpieces 24 to the point of use 94, which may be a collection bin, or otherwise.

Accordingly, with the above system, it is possible to coordinate operation of the first and second machine tool assemblies 12,14 so that they function as a unit. Efficient space utilization is possible without compromising any of the performance characteristics of either machine tool assembly 12,14.

The base assembly 16 may be maintained in the operative state shown by one or more upwardly projecting supports 132,134. The supports 132,134 may define cradle surface 136 (shown only for support 132) having a shape complementary to that of the base assembly 16. With this arrangement, the supports 132,134 effectively isolate the walls 52,90 from the coolant to efficiently dissipate potentially detrimental heat generated through the base assembly during machining operations. The supports 132,134 themselves may be made with a width in a horizontal direction that is substantially less than the width dimension of the surfaces 50,88 taken parallel to the operating axes 26,82.

A conveyor system at 140, consisting of a driven endless belt 142, may be used to intercept and continuously convey parts of workpieces, removed during processing, in the direction of the arrow 143 to a collection receptacle 144 for accumulation and ultimately disposal. The system 140 can be provided on one side, or on opposite sides of the machining system 10. The belt 142 may be made from wire material so that lubricant can migrate therethrough into the receptacle 18. The conveyor system 140 may have multiple, cooperating sections (not shown) which direct the picked up parts of the workpieces horizontally through the receptacle 18 and thereafter upwardly and over a peripheral retaining wall 146 which bounds an accumulation space 148 within the receptacle 18. For simplicity, the belt 142 is shown as a single length, angled upwardly at the downstream end.

The above-described construction lends itself to the use of relatively large motors 30, 30'. A large motor construction facilitates smooth, high speed spindle operation.

While the invention contemplates that the bases 40, 40' for the turrets 42, 42' could be movable, the stationary base construction accounts for a fixed cutting point. Coolant can be directed consistently at the active machining tool 47. Accordingly, predictable cooling permits aggressive and high speed processing to be undertaken without fear of premature wear on the machining tools 47. A stable support for the cutting tools 47, resulting from the fixed base arrangement, also may contribute to predictable alignment of cooperating elements on the machine tool assemblies 12, 14, and thereby high machining accuracy.

By reason of potentially compacting the overall size of the system, the likelihood of deformation of components, as under the influence of weight or heat, may be reduced.

Coordinated operation of all of the components of the machining system 10 can be carried out through a central controller 150, which can be programmed and operated by a user from a control panel 152.

The foregoing disclosure of specific embodiments is intended to be illustrative of the broad concepts comprehended by the invention.

What is claimed is:

1. A machining system comprising:
    a first machine tool assembly comprising a first workpiece holder and a first machining unit for performing a processing operation on a workpiece held by the first workpiece holder;
    a second machine tool assembly comprising a second workpiece holder and a second machining unit for performing a processing operation on a workpiece held by the second workpiece holder;
    a base assembly on which the first and second machine tool assemblies are supported in an operative position and having a top and bottom,
    at least a part of the first machine tool assembly being repositionable by movement along a first line,
    at least a part of the second machine tool assembly being repositionable by movement along a second line that is non-parallel to the first line,
    the parts of the first and second machine tool assemblies being relatively repositionable along the first and second lines to facilitate transfer of a workpiece between the first and second machine tool assemblies; and
    an upwardly opening receptacle for collecting foreign matter,
    wherein the base comprises a flat surface that is uninterrupted from a location adjacent to the first workpiece holder to a bottom edge of the base residing over the receptacle so that foreign matter removed from a workpiece at the first workpiece holder is guided by the flat surface over the bottom edge into the upwardly opening receptacle.

2. A machining system comprising:
    a first machine tool assembly comprising a first workpiece holder and a first machining unit for performing a processing operation on a workpiece held by the first workpiece holder;
    a second machine tool assembly comprising a second workpiece holder and a second machining unit for performing a processing operation on a workpiece held by the second workpiece holder; and
    a base assembly on which the first and second machine tool assemblies are supported in an operative position,
    at least a part of the first machine tool assembly being repositionable by movement along a first line,
    at least a part of the second machine tool assembly being repositionable by movement along a second line that is non-parallel to the first line,
    the parts of the first and second machine tool assemblies being relatively repositionable along the first and second lines to facilitate transfer of a workpiece between the first and second machine tool assemblies,
    wherein the first machine tool assembly has a first central operating axis, the second machine tool assembly has a second central operating axis, the first line and a third line parallel to the first central operating axis reside in a first plane, the second line and a fourth line parallel to the second central operating axis reside in a second plane, and the first and second planes are non-parallel to each other.

3. The machining system according to claim 2 wherein the first and second planes define a downwardly opening angle of less than 135° therebetween.

4. The machining system according to claim 2 wherein the first and second planes define a downwardly opening angle on the order of 90°.

5. The machining system according to claim 1 wherein the first line extends at an angle to a horizontal reference plane.

6. The machining system according to claim 1 wherein the part of the first machine tool assembly comprises a first headstock, the part of the second machine tool assembly comprises a second headstock, each of the headstocks has a central axis and the first and second headstocks are relatively repositionable into a workpiece exchange position wherein the central axes of the first and second headstocks are substantially coincident.

7. A machining system comprising:
    a first machine tool assembly comprising a first workpiece holder and a first machining unit for performing a processing operation on a workpiece held by the first workpiece holder;
    a second machine tool assembly comprising a second workpiece holder and a second machining unit for performing a processing operation on a workpiece held by the second workpiece holder; and
    a base assembly on which the first and second machine tool assemblies are supported in an operative position,
    at least a part of the first machine tool assembly being repositionable by movement along a first line,
    at least a part of the second machine tool assembly being repositionable by movement along a second line that is non-parallel to the first line,
    the parts of the first and second machine tool assemblies being relatively repositionable along the first and second lines to facilitate transfer of a workpiece between the first and second machine tool assemblies,
    wherein the part of the first machine tool assembly comprises a first headstock, the part of the second machine tool assembly comprises a second headstock, each of the headstocks has a central axis and the first and second headstocks are relatively repositionable into a workpiece exchange position wherein the central axes of the first and second headstocks are substantially coincident, wherein the base assembly comprises first and second substantially flat surfaces cooperatively defining an inverted V shape, the first machine tool assembly is mounted on the first flat surface and the second machine tool assembly is mounted on the second flat surface.

8. A method of machining a workpiece, said method comprising the steps of:
performing a first processing operation on a first workpiece using a first machine tool assembly;
at the completion of the first processing operation, moving the first workpiece in a first line that extends in a direction at an angle to horizontal;
transferring the first workpiece to a second machine tool assembly;
performing a second processing operation on the first workpiece; and
moving the first workpiece along a second line that is non-parallel to the first line and extends in a direction at an angle to horizontal.

9. The machining system according to claim 7 wherein the base assembly further comprises an upwardly projecting support, the first flat surface has a width extending parallel to the central axis of the first headstock and the upwardly projecting support has a width dimension parallel to the central axis of the first headstock that is substantially less than the width of the first flat surface.

10. The machining system according to claim 1 wherein the first workpiece holder comprises a first headstock and the first machining unit comprises an indexable turret with a plurality of machining tools.

11. The machining system according to claim 10 wherein the first machine tool assembly further comprises a first conveyor for delivering workpieces to be processed to a transfer location.

12. The machining system according to claim 11 wherein the first machine tool assembly further comprises a first transfer mechanism to engage a workpiece on the first conveyor and deliver an engaged workpiece toward a position at which an engaged workpiece can be operatively held by the first headstock.

13. The machining system according to claim 12 wherein the machine tool assembly further comprises a second conveyor for delivering workpieces from the second workpiece holder to a point of use.

14. The machining system according to claim 13 wherein the second machine tool assembly comprises a second transfer mechanism to engage a workpiece on the second workpiece holder and deliver an engaged workpiece to the second conveyor.

15. The machining system according to claim 12 wherein the first transfer mechanism comprises first and second jaws that are relatively movable between a gripping position, to hold a workpiece, and a release position.

16. A machining system comprising:
a first machine tool assembly comprising a first workpiece holder and a first machining unit for performing a processing operation on a workpiece held by the first workpiece holder;
a second machine tool assembly comprising a second workpiece holder and a second machining unit for performing a processing operation on a workpiece held by the second workpiece holder; and
a base assembly on which the first and second machine tool assemblies are supported in an operative position,
at least a part of the first machine tool assembly being repositionable by movement along a first line,
at least a part of the second machine tool assembly being repositionable by movement along a second line that is non-parallel to the first line,
the parts of the first and second machine tool assemblies being relatively repositionable along the first and second lines to facilitate transfer of a workpiece between the first and second machine tool assemblies,
wherein the first machine tool assembly has a first central operating axis, the second machine tool assembly has a second central operating axis, the first line and a third line parallel to the first central operating axis reside in a first plane, the second line and a fourth line parallel to the second central operating axis reside in a second plane, and the first and second planes are non-parallel to each other,
wherein the first central operating axis extends in a horizontal direction.

17. A machining system comprising:
a first machine tool assembly comprising a first headstock for holding a workpiece on which a processing operation is to be performed;
a second machine tool assembly comprising a second headstock for holding a workpiece on which a processing operation is to be performed; and
a base assembly on which the first and second machine tool assemblies are supported in an operative position,
the first headstock being movable along two transverse axes residing in a first plane,
the second headstock being movable along two transverse axes residing in a second plane,
wherein the first and second planes are non-parallel to each other.

18. The machining system according to claim 17 wherein the first and second planes cooperatively define an inverted V shape.

19. The machining system according to claim 18 wherein the first and second planes open downwardly at an angle of less than 135°.

20. The machining system according to claim 18 wherein the first and second planes open downwardly at an angle on the order of 90°.

21. A machining system comprising:
a first machine tool assembly comprising a first headstock for holding a workpiece on which a processing operation is to be performed;
a second machine tool assembly comprising a second headstock for holding a workpiece on which a processing operation is to be performed; and
a base assembly on which the first and second machine tool assemblies are supported in an operative position,
the base assembly comprising a first substantially flat surface and a second substantially flat surface which is angularly oriented relative to the first flat surface so that first and second planes including the first and second flat surfaces define an inverted V shape,
the first machine tool assembly residing above the first flat surface so that at least one of a lubricant and pieces of a workpiece removed during processing using the first machine tool assembly are guided downwardly by the first surface,
the second machine tool assembly residing above the second flat surface so that at least one of a lubricant and pieces of a workpiece removed during processing using the second machine tool assembly are guided downwardly by the second surface.

22. The machining system according to claim 21 further comprising an upwardly opening receptacle to collect at least one of a lubricant and pieces of a workpiece removed during processing using the first machine tool assembly and guided downwardly by the first surface.

23. The machining system according to claim 22 wherein the first machine tool assembly comprises a first headstock for holding a workpiece, the second machine tool assembly comprises a second headstock for holding a workpiece, and the first and second headstocks are relatively repositionable so as to facilitate exchange of a workpiece between the first and second headstocks.

24. The machining system according to claim 23 wherein the first and second headstocks each have a central axis and are relatively repositionable into an exchange position wherein the central axes of the first and second headstocks are substantially coincident.

25. The machining system according to claim 24 wherein the first headstock is positionable in an operating position and the first headstock is movable in a first plane between the operating position and a position in which the first headstock resides with the first and second headstocks in the exchange position and the first plane is angularly oriented relative to a horizontal reference plane.

26. The machining system according to claim 25 wherein the second headstock is positionable in an operating position and the second headstock is movable in a second plane between the operating position for the second headstock and a position in which the second headstock resides with the first and second headstocks in the exchange position and the second plane is angularly oriented relative to the first plane and the horizontal reference plane.

27. The machining system according to claim 26 wherein the first and second planes cooperatively define an inverted V shape.

28. The method of machining a workpiece according to claim 8 further comprising the steps of advancing the first workpiece on a first conveyor toward a first headstock on the first machine tool assembly and through a first transfer mechanism engaging the first workpiece and delivering the engaged first workpiece to the first headstock.

29. The method of machining a workpiece according to claim 8 wherein the first and second lines cooperatively define an inverted V shape.

30. The method of machining a workpiece according to claim 8 further comprising the steps of directing at least one of a lubricant and pieces of the first workpiece removed during the first processing operation along a first inclined surface downwardly to a collection area.

31. The method of machining a workpiece according to claim 30 further comprising the step of collecting the at least one of lubricant and pieces of the first workpiece removed during the first processing operation in a receptacle.

32. The method of machining a workpiece according to claim 30 further comprising the steps of directing the at least one of lubricant and pieces of the first workpiece removed during the second processing operation along a second inclined surface downwardly to a collection area.

33. The method of machining a workpiece according to claim 32 wherein the first and second inclined surfaces cooperatively define an inverted V shape.

34. The method of machining a workpiece according to claim 8 wherein the step of transferring the first workpiece comprises repositioning at least one of a first headstock on the first machine tool assembly and a second headstock on the second machine tool assembly so that the first and second headstocks are in an exchange position and so that the first workpiece can be transferred directly from the first headstock to the second headstock.

35. The method of machining a workpiece according to claim 34 wherein the first and second headstocks each have a central axis and with the first and second headstocks in the exchange position the central axes of the first and second headstocks are substantially coincident.

36. The method of machining a workpiece according to claim 8 wherein the step of performing a first processing operation comprises performing a first processing operation using a tool on a first indexable turret.

37. The method of machining a workpiece according to claim 36 wherein the step of performing a second processing operation comprises performing a second processing operation using a tool on a second indexable turret.

38. The method of machining a workpiece according to claim 28 further comprising the steps of using a second transfer mechanism to remove the first workpiece from a second headstock on the second machine tool assembly and transferring the first workpiece to a second conveyor through which the first workpiece is advanced to a point of use.

* * * * *